US010281593B2

(12) United States Patent
Hu et al.

(10) Patent No.: US 10,281,593 B2
(45) Date of Patent: May 7, 2019

(54) ENERGY DETECTION APPARATUS, METHODS, AND SYSTEMS

(71) Applicant: Halliburton Energy Services, Inc., Houston, TX (US)

(72) Inventors: Yike Hu, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 175 days.

(21) Appl. No.: 15/127,754

(22) PCT Filed: Jun. 1, 2015

(86) PCT No.: PCT/US2015/033579
§ 371 (c)(1),
(2) Date: Sep. 20, 2016

(87) PCT Pub. No.: WO2016/076919
PCT Pub. Date: May 19, 2016

(65) Prior Publication Data
US 2017/0199283 A1    Jul. 13, 2017

Related U.S. Application Data

(63) Continuation-in-part of application No. PCT/US2014/064793, filed on Nov. 10, 2014.

(51) Int. Cl.
*G01V 5/12* (2006.01)
*G01T 1/20* (2006.01)
(Continued)

(52) U.S. Cl.
CPC .......... *G01T 1/2018* (2013.01); *G01T 1/1648* (2013.01); *G01V 5/12* (2013.01); *G21K 1/02* (2013.01)

(58) Field of Classification Search
CPC ........... G01T 1/00; G01T 1/20; G01T 1/2018; G01V 5/00; G01V 5/12; G01V 5/125;
(Continued)

(56) References Cited

U.S. PATENT DOCUMENTS 7,633,058 B2   12/2009   Stoller et al.
8,803,075 B2   8/2014    Menge et al.
(Continued)

FOREIGN PATENT DOCUMENTS

JP    08160145 A      6/1996
JP    2005249411 A    9/2005
(Continued)

OTHER PUBLICATIONS

"U.S. Appl. No. 15/026,167, Preliminary Amendment filed Mar. 30, 2016", 3 pgs.
(Continued)

*Primary Examiner* — Jurie Yun
(74) *Attorney, Agent, or Firm* — Haynes and Boone, LLP

(57) ABSTRACT

In some embodiments, an apparatus and a system, as well as a method, may operate to transform photons received at a scintillator into scintillation energy at a light yield efficiency of at least 30% at temperatures above 150 C. Further activities may include converting the scintillation energy to electron-hole pairs within a pixelated array of a position-sensitive detector having a bandgap of at least 2 eV. Additional apparatus, systems, and methods are described.

21 Claims, 7 Drawing Sheets

(51) Int. Cl.
*G21K 1/02* (2006.01)
*G01T 1/164* (2006.01)

(58) Field of Classification Search
CPC .. G01V 5/0016; G01V 5/0025; G01V 5/0066; G01V 5/04; G01V 5/045; G01V 5/10; G01V 5/101; G01V 5/08; G01V 5/102; G01V 5/104; G01N 23/20; G01N 23/203
USPC .................................. 378/62, 70, 86, 87, 88
See application file for complete search history.

(56) References Cited

U.S. PATENT DOCUMENTS

| | | |
|---|---|---|
| 2002/0020846 A1 | 2/2002 | Pi et al. |
| 2004/0042585 A1 | 3/2004 | Nagarkar et al. |
| 2013/0168567 A1 | 7/2013 | Wartski et al. |
| 2014/0037065 A1 | 2/2014 | Botto |
| 2014/0319330 A1 | 10/2014 | Berheide et al. |

FOREIGN PATENT DOCUMENTS

| | | |
|---|---|---|
| WO | WO-2016076824 A1 | 5/2016 |
| WO | WO-2016076919 A1 | 5/2016 |
| WO | WO-2016076920 A2 | 5/2016 |

OTHER PUBLICATIONS

"International Application Serial No. PCT/US2014/064793, International Search Report dated Aug. 7, 2015", 3 pgs.

"International Application Serial No. PCT/US2014/064793, Written Opinion dated Aug. 7, 2015", 10 pgs.

"International Application Serial No. PCT/US2015/033579, International Search Report dated Aug. 21, 2015", 3 pgs.

"International Application Serial No. PCT/US2015/033579, Written Opinion Aug. 21, 2015", 9 pgs.

"International Application Serial No. PCT/US2015/033589, International Search Report dated Aug. 26, 2015", 3 pgs.

"International Application Serial No. PCT/US2015/033589, Written Opinion dated Aug. 26, 2015", 8 pgs.

ENERGY DETECTION APPARATUS, METHODS, AND SYSTEMS

RELATED APPLICATIONS

This application is a U.S. National Stage Filing under 35 U.S.C. 371 of International Patent Application Serial No. PCT/US2015/033579, filed 1 Jun. 2015 . and published on 19 May 2016 as WO 2016/076919 A1 which is a continuation-in-part of PCT Application Serial No. PCT/US2014/064793, filed 10 Nov. 2014, and published on 19 May 2016 at WO 2016/076824 A1 and which claims priority to PCT Application Serial No. PCT/US2014/064793, filed 10 Nov. 2014 (hereinafter the "Priority Application"), which Priority Application designated all PCT contracting states, and which Priority Application is incorporated herein by reference in its entirety. This application is related to PCT Application Serial No. PCT/US2015/033589, filed 1 Jun. 2015. and published as WO 2016/076920 A1 titled "Photon Collimation Apparatus ", Systems, and Methods.

BACKGROUND

Understanding the structure and properties of geological formations can reduce the cost of drilling wells for oil and gas exploration. Measurements made in a borehole (i.e., downhole measurements) are typically performed to attain this understanding, to identify the composition and distribution of material that surrounds the measurement device downhole.

For example, portions of the formation or cement surrounding a borehole may be imaged using various forms of energy, including ultrasound, radio-frequency, and X-rays. With the elevated temperatures present in the downhole environment, the various devices used to obtain such images sometimes experience varying degrees of success.

DETAILED DESCRIPTION

Figure 1:
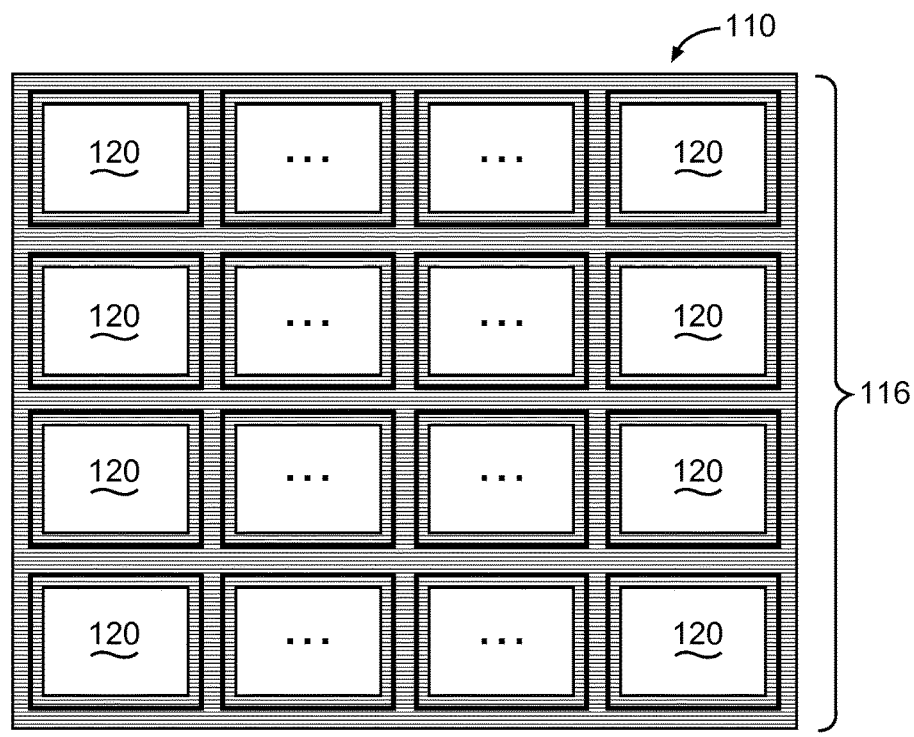
FIG. 1 is a top, plan view of position-sensitive detector according to various embodiments of the invention.

In imaging devices that use a scintillation crystal and conventional electronics for position-sensitive measurements, detection efficiency may degrade as temperatures increase. Thus, when such devices are employed downhole, light yield may be lower than desired, and detection signals may be blurred by high noise levels. To address some of these challenges, as well as others, apparatus, systems, and methods are described herein that provide improved detection efficiency in the downhole environment.

In most embodiments, photons with an energy of approximately 50 keV to 400 keV can be received by a scintillator and transformed into scintillation energy, or "light". Light yield efficiency (i.e., conversion efficiency) within the scintillator is a function of temperature, and is relative, being measured in comparison with the efficiency of the scintillator operating at room temperature (20 C.). Thus, in some embodiments, an apparatus comprises a scintillator suitable for downhole applications to receive high energy photons and transform the photons into scintillation light; and a position-sensitive detector made from a wide bandgap semiconductor energetically coupled to the scintillator, where the detector comprises an array of pixels, to receive and convert the energy to electron-hole pairs.

Various embodiments may thus provide a position-sensitive detector for downhole X-ray imaging, operable at elevated temperatures. The apparatus includes a position-sensitive area detector coupled to a scintillator. The position-sensitive area detector may comprise a pixelated sensing array made from a wide-bandgap material, such as a semiconductor, to maintain a low dark current level at elevated environmental temperatures. The scintillator may comprise a crystal which provides an improved light yield (when compared to conventional devices) at these same temperatures.

This apparatus functions well for downhole imaging in conjunction with an X-ray source. The advantages which may accrue include the following:

relatively high detection efficiency when immersed in an elevated temperature downhole environment;

position-sensitive photon detection for downhole X-ray imaging; and the apparatus is able to stop hard (high-energy) X-rays, in continuous or pixelated formats.

To provide a more consistent use of terminology throughout this document, specific terms and phrases are used. They are defined as follows:

housing means any one or more of a drill collar, a downhole tool, or a wireline logging tool body (all having an outer surface, to enclose or attach to detectors, PSRs, magnetometers, sensors, fluid sampling devices, pressure measurement devices, temperature measurement devices, transmitters, receivers, acquisition and processing logic, and data acquisition systems).

image, when used as a noun, means a collection of pixel data that can be processed to form a human-readable representation of a thing, such as a formation; when used as a verb, this terms refers to the activity of sensing, over a set of elements, the relative amount of energy directed to those elements according to their location with respect to the surrounding environment.

A scintillator is suitable for downhole applications when it has a light yield efficiency of at least 30% at temperatures above 150 C. (in comparison to the light yield achieved at an ambient temperature of 20 C.).

A material has a wide bandgap when the bandgap is at least 2 eV.

FIG. 1 is a top, plan view of position-sensitive detector 110 according to various embodiments of the invention. In this illustration, the position-sensitive detector 110 can be seen to include a pixelated, two-dimensional sensing array 116. The sensing elements, comprising pixels 120, may be fabricated as charge-coupled device (CCD) elements, complementary metal-oxide semiconductor (CMOS) image sensor elements, or photon-detecting p-n or p-i-n diodes, among others.

Figure 2:
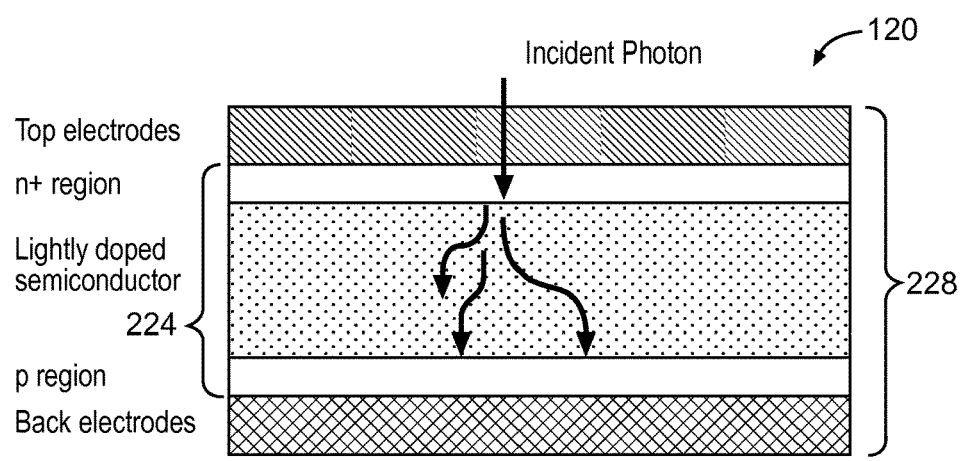
FIG. 2 is a sectioned side, cut-away material type view of a single pixel 120 forming part of the detector shown in FIG. 1.

FIG. 2 is a sectioned side, cut-away material type view of a single pixel 120 forming part of the detector 110 shown in FIG. 1. Referring to FIGS. 1 and 2, in some embodiments, the pixelated position-sensitive detector 110 is made from a wide-bandgap semiconductor 224. The semiconductor 224 may be selected or fabricated to have a characteristic dark current that does not significantly increase when immersed in an ambient temperature above 150 C. Semiconductors 224 with such properties include: silicon carbide (SiC), thallium bromide (TlBr), cadmium manganese telluride (CdMnTe), and nitride-based materials, such as aluminum nitride (AlN). The pixel 120 in some embodiments comprises a single photodiode 228 having a p-i-n structure that forms part of a photodiode array.

Figure 3:
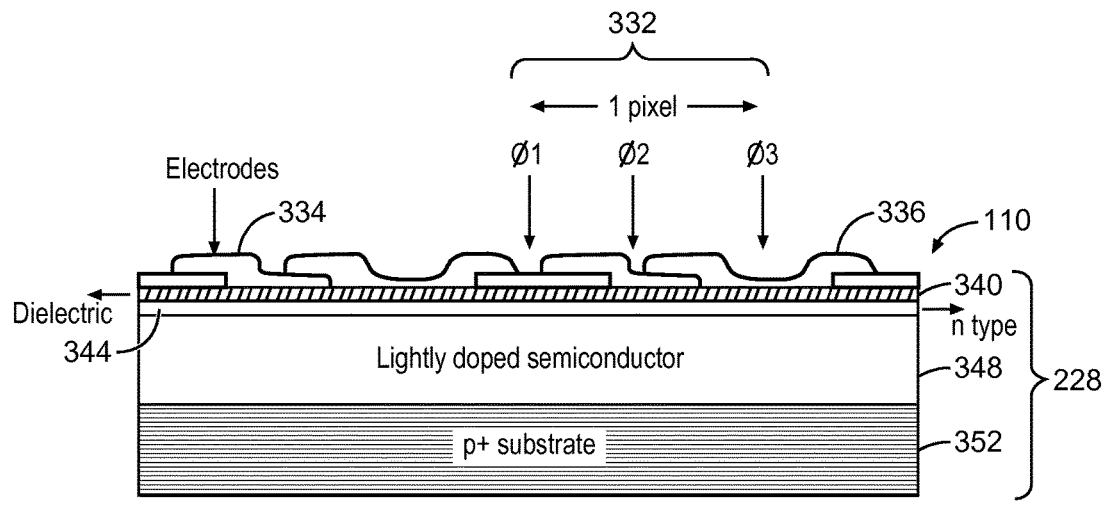
FIG. 3 is a sectioned side, cut-away material type view of an embodiment of the detector shown in FIG. 1.

FIG. 3 is a sectioned side, cut-away material type view of an embodiment of the detector 110 shown in FIG. 1. Here the detector 110 comprises a three-phase CCD structure 332. The detector 110 includes conductive electrodes 334, 336, a gate dielectric 340, a negatively doped SiC layer 344, a lightly doped SiC region 348, and a positively doped SiC substrate 352. Incident photons generate electron-hole pairs inside the lightly doped SiC region 348, which are collected by the positive/negative electrodes 334, 336, respectively.

Figure 4:
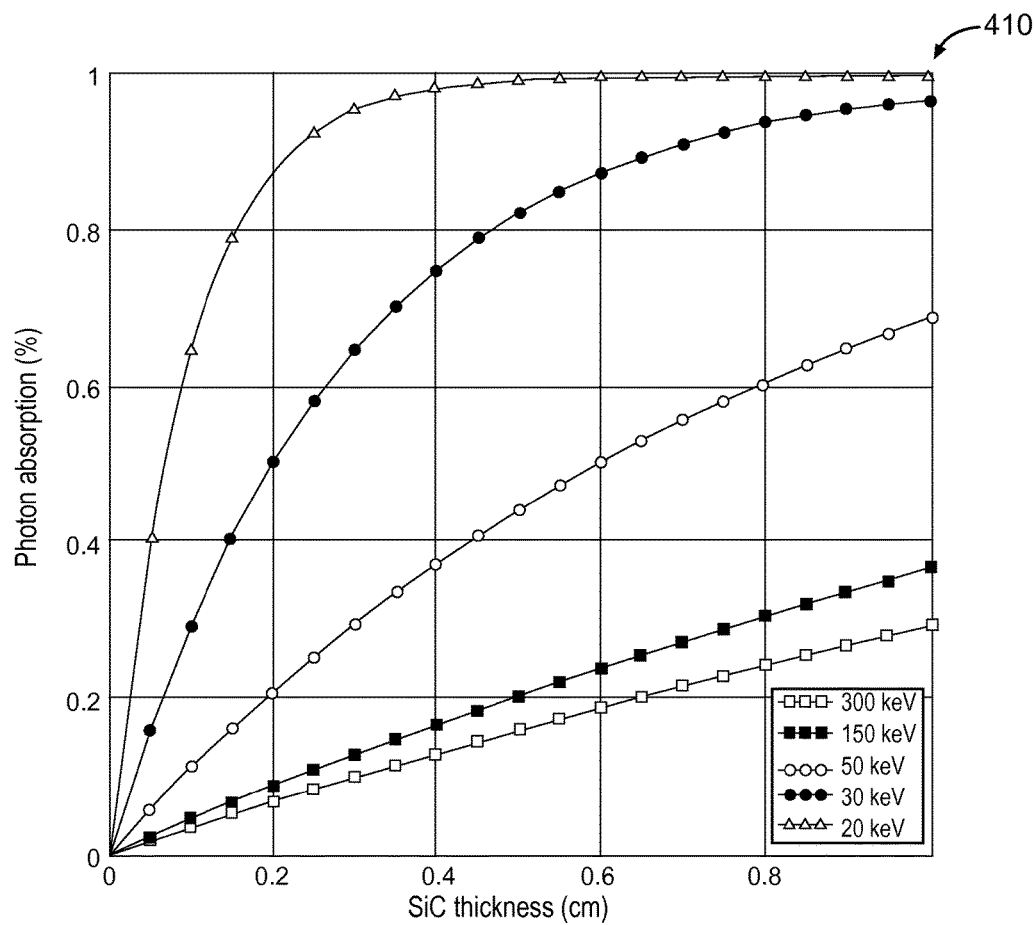
FIG. 4 is a graph that illustrates silicon carbide (SiC) photon absorption, over a variety of energy levels, according to various embodiments of the invention.

FIG. 4 is a graph 410 that illustrates silicon carbide (SiC) photon absorption, over a variety of energy levels, according to various embodiments of the invention. Here the curves show the fraction of incident X-ray energy that is absorbed, over a range of 20 keV to 300 keV, as the thickness of the SiC varies from 0 cm to 1 cm. Due to its low atomic number, a relatively thick layer of SiC (e.g., greater than 10 cm) is needed to fully absorb (e.g., at least 90%) of the X-rays with energy levels of greater than 200 keV.

Figure 5:
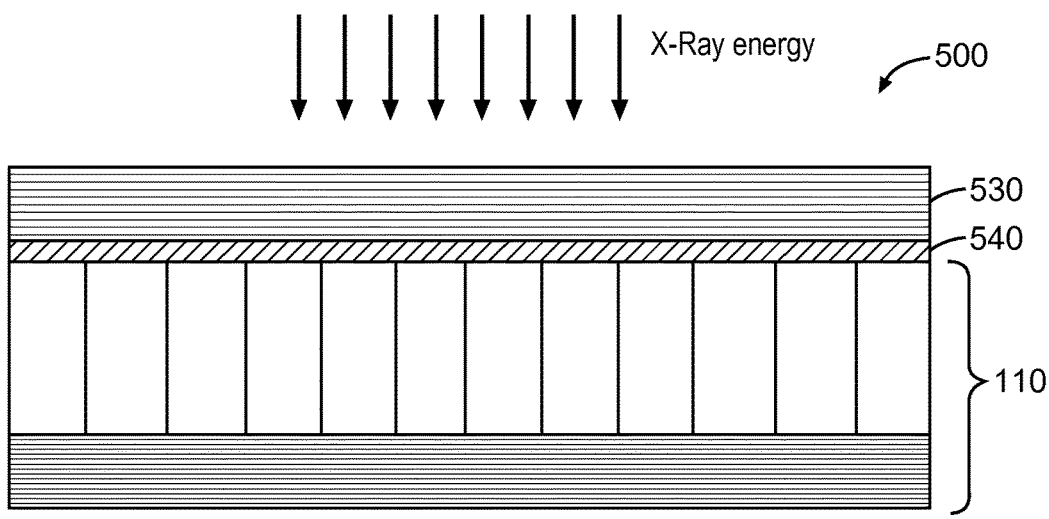
FIG. 5 is a sectioned side, cut-away view of an energy detection apparatus, with a continuous scintillator, according to various embodiments of the invention.

FIG. 5 is a sectioned side, cut-away view of an energy detection apparatus 500, with a continuous scintillator 530, according to various embodiments of the invention. The apparatus 500 can be used for X-ray imaging, having a position-sensitive detector 110 coupled to a continuous scintillator 530. When the scintillator 530 is coupled to the detector, via the coupling medium 540, X-rays with relatively high energy can be fully absorbed.

For the scintillator 530, materials that provide a good light yield at elevated temperatures include: NaI:Tl, LaBr$_3$:Ce, LaCl$_3$:Ce, Y$_3$Al$_5$O$_{12}$:Ce, YAlO$_3$:Ce, LuAlO$_3$:Ce, Gd$_2$SiO$_5$:Ce, ZnSe:Te, (Lu,Y)$_2$SiO$_5$:Ce, CsI:Na, or CsI:Tl. The coupling medium 540 may comprise a plastic or an adhesive (e.g., epoxy, or optical cement).

Figure 6:
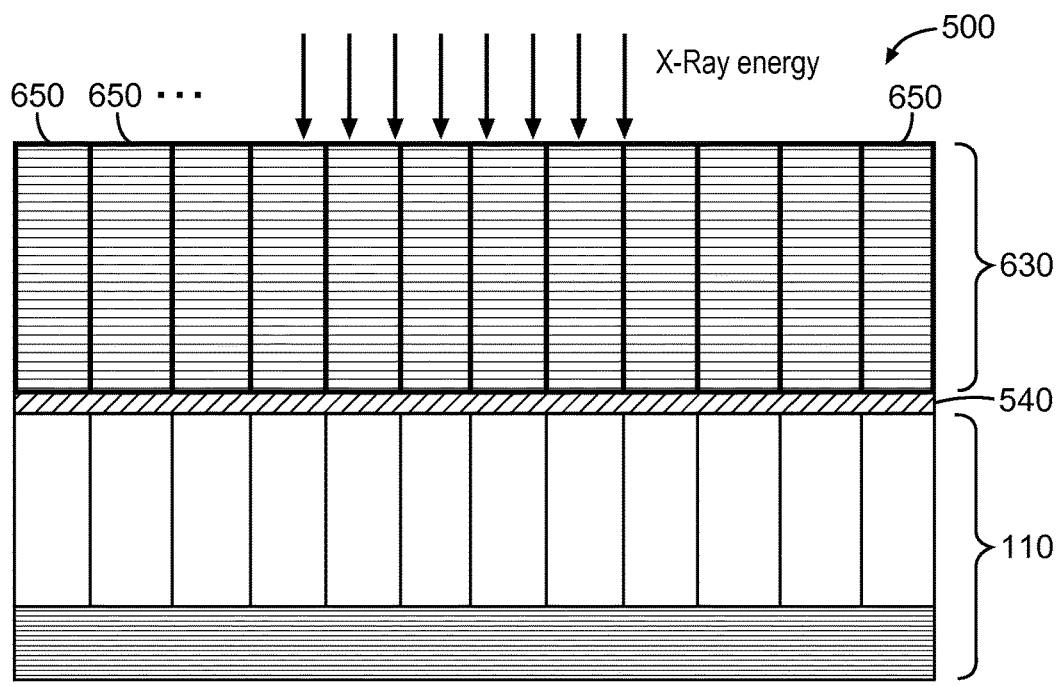
FIG. 6 is a sectioned side, cut-away view of an energy detection apparatus, with a pixelated scintillator, according to various embodiments of the invention.

FIG. 6 is a sectioned side, cut-away view of an energy detection apparatus 500, with a pixelated scintillator 630, according to various embodiments of the invention. Thus, the major difference between the embodiment of the apparatus 500 shown in FIG. 5, and the embodiment of the apparatus 500 is the structure of the scintillator 530, 630 respectively.

In the continuous scintillator (see FIG. 5), the spatial resolution deteriorates as the thickness increases. In FIG. 6, the scintillator component is partitioned into scintillator elements 650 to make a pixelated scintillator 630. The scintillator crystal can be divided into the elements 650 using reflective material (e.g., a metal, such as aluminum) to separate each element 650 from the others, to reduce light crosstalk between the elements 650, and increase spatial resolution for the scintillator component as a whole.

Referring now to FIGS. 5 and 6, those of ordinary skill in the art, after reviewing this document, will realize that the apparatus 500, whether it includes a continuous scintillator 530 or a pixelated scintillator 630, can provide reliable imaging operation at elevated temperatures, such as at temperatures greater than 150 C. or greater than 175 C. This is because, in some embodiments, the apparatus 500 couples a wide-bandgap semiconductor, operating as the position-sensitive detector 110, and a high temperature scintillator, which may comprise a continuous scintillator 530, or a pixelated scintillator 630. The wide-bandgap semiconductor, perhaps taking the form of SiC or TlBr, maintains low dark current operation at temperatures up to at least 150 C., and beyond. This capability provides relatively low detection noise, with good light yield efficiency, at higher temperatures—in the downhole environment. The array of pixels in the detector 110 provides position information for imaging purposes. And since a scintillator is used as the detection element, there is also the capability to detect X-rays with higher energies (up to 300 keV, and beyond). With this higher energy comes a higher penetration ability, increasing the overall usefulness of the apparatus 500 in the downhole environment, where many X-ray energy absorbers can be present. Still further embodiments may be realized.

Figure 7:
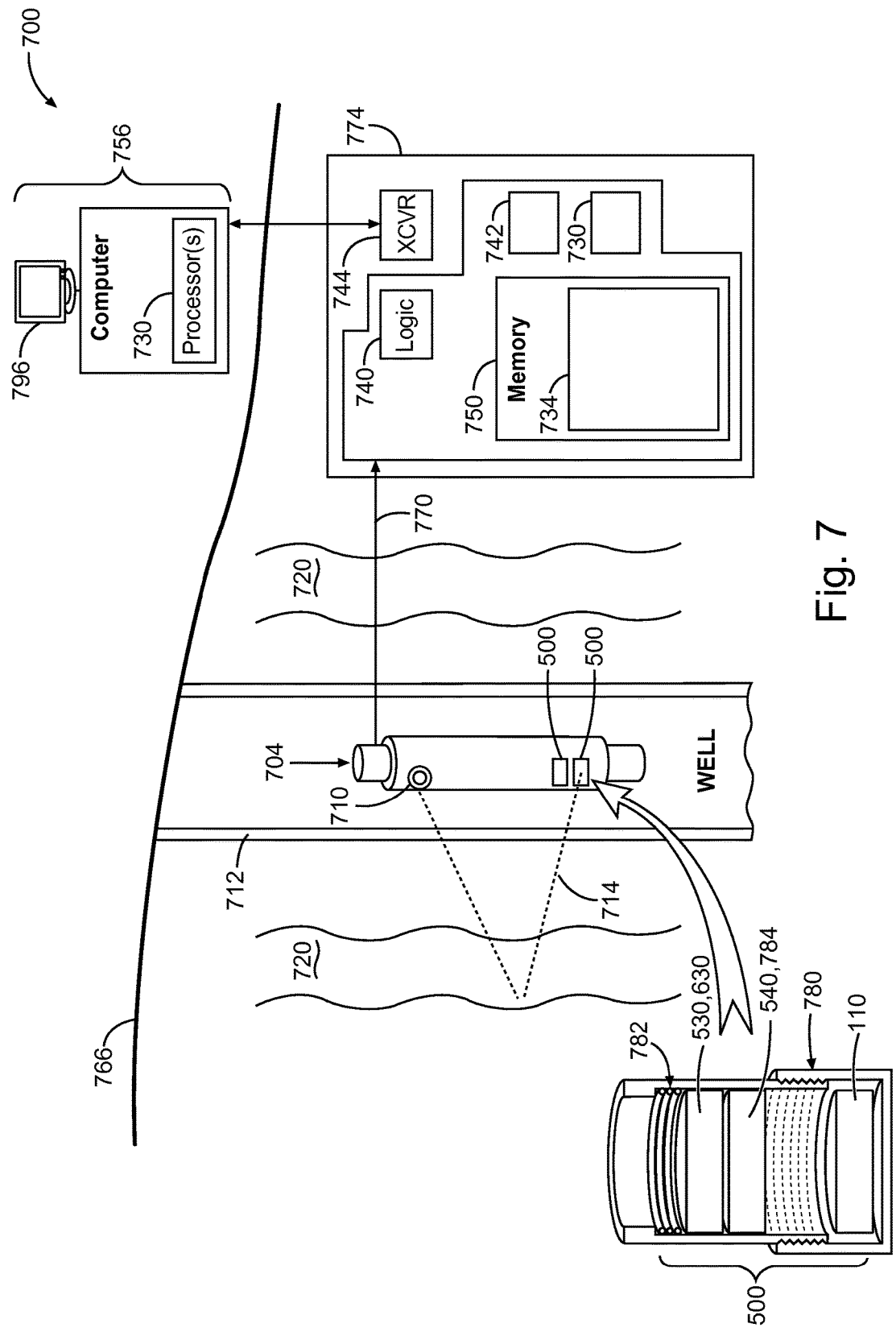
FIG. 7 is a block diagram of apparatus and systems according to various embodiments of the invention.

For example, FIG. 7 is a block diagram of apparatus 500 and systems 700 according to various embodiments of the invention. In some embodiments, a system 700 includes a housing 704. The housing 704 might take the form of a wireline tool body, or a downhole drilling tool. Processor(s) 730 within the system 700 may be located at the surface 766, as part of a surface logging facility 756, or in a data acquisition system 774, which may be above or below the Earth's surface 766 (e.g., attached to the housing 704 and/or wholly disposed therein).

A system 700 may further comprise a data transceiver 744 (e.g., a telemetry transmitter and/or receiver) to transmit acquired data 770 to a surface logging facility 756. The data 770 may comprise measured current and/or image information, such as the magnitude of individual energy signals captured by position-sensitive elements in the apparatus 500 resulting from an energy source 710 that transmits energy (e.g., X-rays) into a formation 720, which is reflected to form energy 714 that impinges on the apparatus 500. Logic 740 can be used to acquire the data as signals, according to the various methods described herein. The acquired data 770, as well as other data, can be stored in the memory 750, perhaps as part of a database 734. The processors 730 can be used to process the data 770 to form images of cement 712 surrounding a well, or the formation 720 itself.

Thus, referring to FIGS. 1-7, it can be seen that many embodiments may be realized. For example, an apparatus 500 may comprise a scintillator 530, 630 to receive photons and transform the photons into scintillation energy at a light yield efficiency of at least 50% at temperatures above 150 C. The apparatus 500 may further comprise a position-sensitive detector 110 having a bandgap of at least 2 eV coupled to the scintillator 530, 630, the detector 110 to receive the scintillation energy at an array of pixels 120, and to convert the scintillation energy to electron-hole pairs.

The scintillator, as well as the detector, can be divided into pixels 120. Thus, in some embodiments, the scintillator comprises a pixelated scintillator 630.

The scintillator can be formed from a variety of materials. Thus in some embodiments, the scintillator comprises at least one of NaI:Tl, LaBr$_3$:Ce, LaCl$_3$:Ce, Y$_3$Al$_5$O$_{12}$:Ce, YAlO$_3$:Ce, LuAlO$_3$:Ce, Gd$_2$SiO$_5$:Ce, ZnSe:Te, (Lu,Y)$_2$SiO$_5$:Ce, CsI:Na, or CsI:Tl.

The detector 110 can likewise be fabricated using a variety of materials. For example, in some embodiments, the detector 110 comprises a semiconductor. In some of those embodiments, the semiconductor comprises at least one of a bromide, a carbide, or a nitride. In other embodiments, the semiconductor comprises at least one of silicon carbide (SiC), thallium bromide (TlBr), cadmium manganese telluride (CdMnTe), or aluminum nitride (AlN).

The detector may be formed to operate as a CCD. Thus, in some embodiments, the detector 110 comprises a CCD, a CMOS image sensor, or a photodiode.

The CCD can be structured as a combination of doped layers. Thus, in some embodiments, CCD comprises a three-phase, silicon carbide (SiC) device (e.g., structure 332 in FIG. 3).

A coupling mechanism can be used to join the scintillator to the detector. Thus, in some embodiments, the apparatus 500 comprises a coupling mechanism used to attach the scintillator to the detector. The mechanism may take a variety of forms, used separately, or in combination. For example, in some embodiments, the coupling mechanism comprises a threaded assembly 780. In some embodiments, the coupling mechanism comprises a spring-loaded assembly 782. A spring can be disposed at several locations within the case of the apparatus 500, such as proximate to the scintillator 530 (shown in the figure), to the medium 540, to the detector 110, or to a combination of these (not shown in the figure). Some embodiments comprise a combination of threaded and spring-loaded assemblies.

Epoxy, and other materials can be used as the coupling mechanism. When the materials are transparent to scintillation energy, they may also be interposed between the elements of the apparatus, and serve as an energy coupling medium. Thus, in some embodiments, the coupling mechanism comprises epoxy 784, the epoxy to serve as an energy coupling medium for the scintillation energy between the scintillator and the detector.

A system 700 may be formed from the scintillator-detector apparatus 500, combined with a source of photons, and a housing. Thus, in some embodiments, a system 700 comprises a source 710 of photons, an apparatus 500 as described previously, and a housing 704 to contain at least one of the source 710 of photons or the detector 110 in the apparatus 500, the housing 704 comprising one of a wireline tool or a drilling tool.

The source 710 of photons may comprise an X-ray source. For example, in some embodiments, the source 710 of photons comprises one of a continuous X-ray source or a pulsed X-ray source.

Reflective material, such as a metal, can be used to separate the scintillator into pixels. Thus, in some embodiments, the scintillator comprises a pixelated scintillator 630 having individual pixels separated by a reflective material.

Although it is not necessary, scintillator elements 650 may be aligned with pixels 120 of the detector 110. Thus, in some embodiments, the individual elements 650 of the scintillator 630 are aligned with the pixels 120 in the array of the detector 110. Correspondence between the number of elements 650 and the number of aligned pixels 120 may be 1:1, 1:many (e.g., 1:4), or many:1 (4:1), respectively.

In some embodiments, the system 700 may comprise one or more processors 730 to operate various components in the system 700, and to process data 770 acquired therefrom. Thus, a system 700 may comprise a processor 730 coupled to a memory 750 including a program, wherein the program, when executed, operates to direct the processor 730 to operate the energy source 710 and to receive signals (e.g., taking the form of data 770, or even electrical signals provided directly from the apparatus 500 to the logic 740.

The apparatus 500; system 700, and each of their elements may all be characterized as "modules" herein. Such modules may include hardware circuitry, and/or a processor and/or memory circuits, software program modules and objects, and/or firmware, and combinations thereof, as desired by the architect of the apparatus 500 and systems 700, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a formation imaging package, an energy detection and measurement package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 500 and systems 700 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, vehicles, geothermal tools, and smart transducer interface node telemetry systems, among others. Some embodiments include a number of methods.

Figure 8:
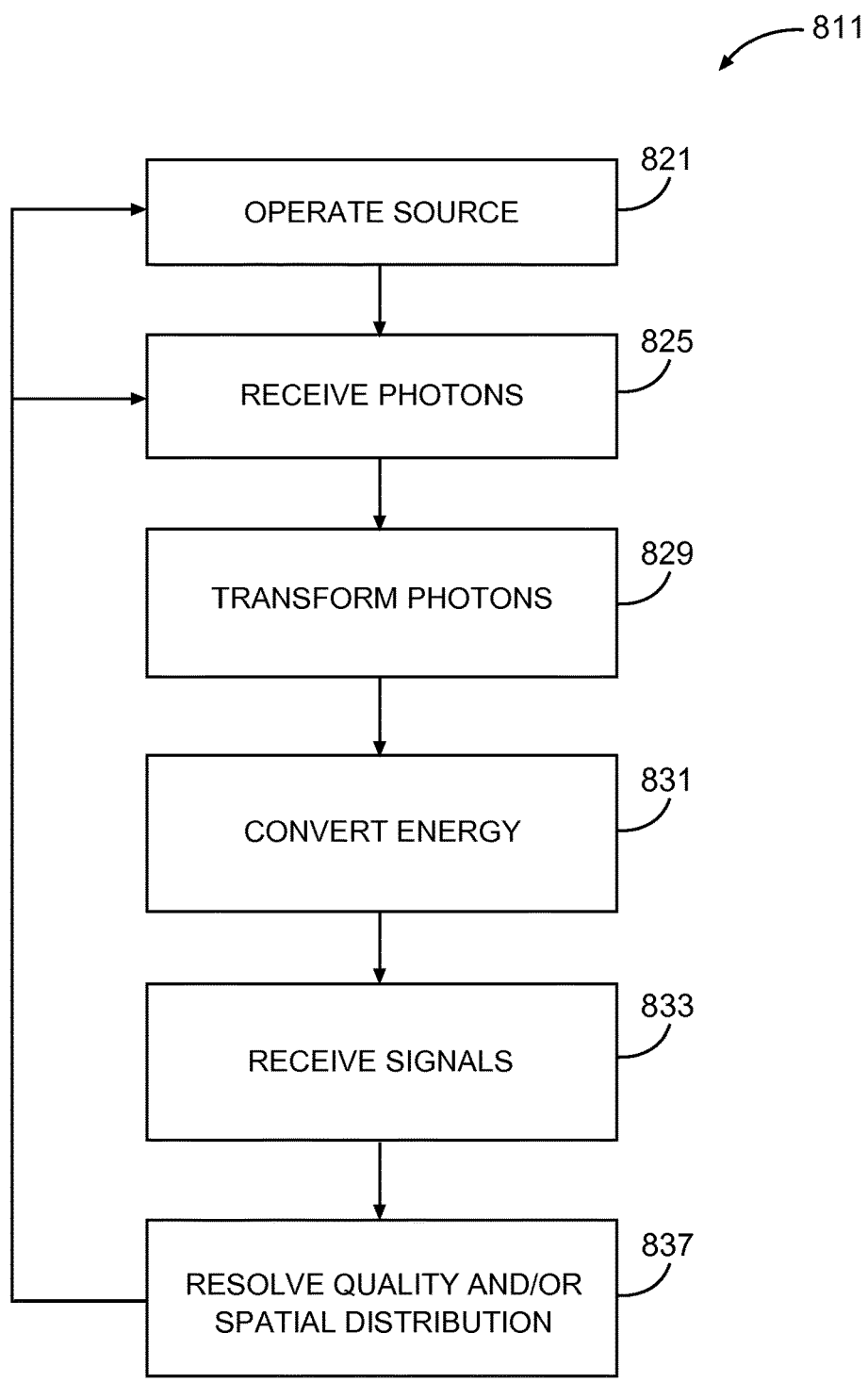
FIG. 8 is a flow chart illustrating several methods according to various embodiments of the invention.

For example, FIG. 8 is a flow chart illustrating several methods 811 according to various embodiments of the invention. The methods 811 may comprise processor-implemented methods, to execute on one or more processors that perform the methods. For example, one embodiment of the methods 811 may begin at block 829 with transforming photons into scintillation energy at relatively high temperature, continuing with converting the scintillation energy into electron-hole pairs, also at relatively high temperature, at block 831. Other embodiments may be realized.

For example, a method 811 may begin at block 821 with operating a source of the photons to provide photons on a periodic basis. The source of the photons may in some embodiments comprise an X-ray source.

The method 811 may continue on to block 825, to include receiving the photons at a scintillator, constructed according to the principles described herein. When they are received at the scintillator, the photons may have an energy of about 50 keV to about 400 keV.

To reduce cross-talk and/or increase imaging resolution, photons can be received using a scintillator that has been divided into pixels using a reflective material, including a metal, such as aluminum. Thus, in some embodiments, the activity at block 825 includes reducing scintillation light cross-talk by receiving the photons at the scintillator using reflective material guides forming separate elements in the scintillator (e.g., forming a pixelated scintillator 630 comprising elements 650 in FIG. 6).

In some embodiments, the method 811 continues on to block 829 to include transforming the photons received at the scintillator into scintillation energy at a light yield efficiency of at least 30% at temperatures above 150 C.

In some embodiments, the method 811 continues on to block 831 to include converting the scintillation energy to electron-hole pairs within a pixelated array of a position-sensitive detector having a bandgap of at least 2 eV.

Signals corresponding to the resulting electron-hole pairs can be received as well. Thus, some embodiments of the method 811 may comprise receiving signals corresponding to the electron-hole pairs in the detector, at block 833.

The signals can be resolved in different ways to provide downhole formation images. Thus, in some embodiments, the method 811 includes resolving the quantity and/or spatial distribution of the electron-hole pairs at the detector, based on the signals.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIG. 8) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein.

For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 9:
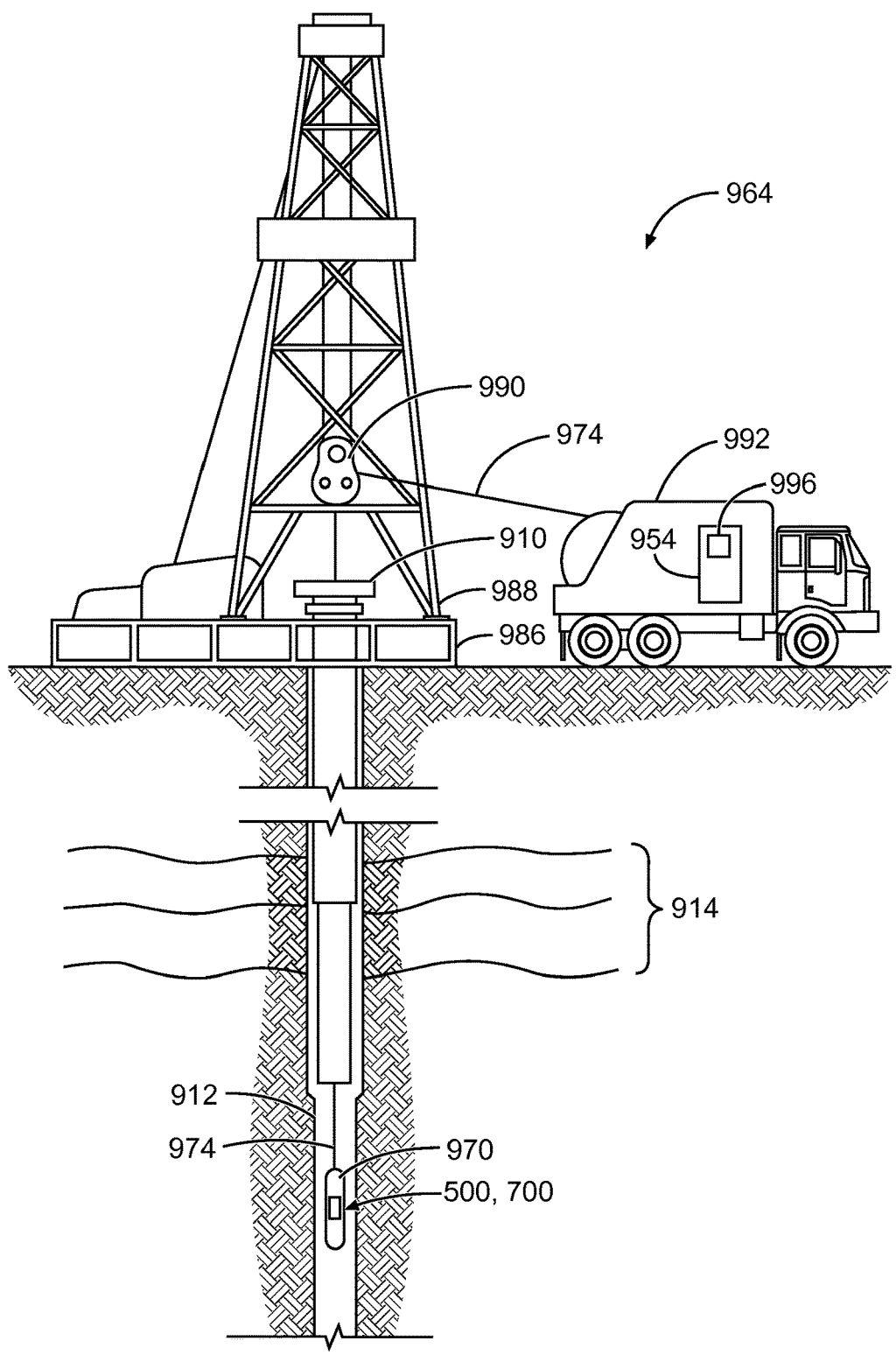
FIG. 9 illustrates a wireline system embodiment of the invention.
Figure 10:
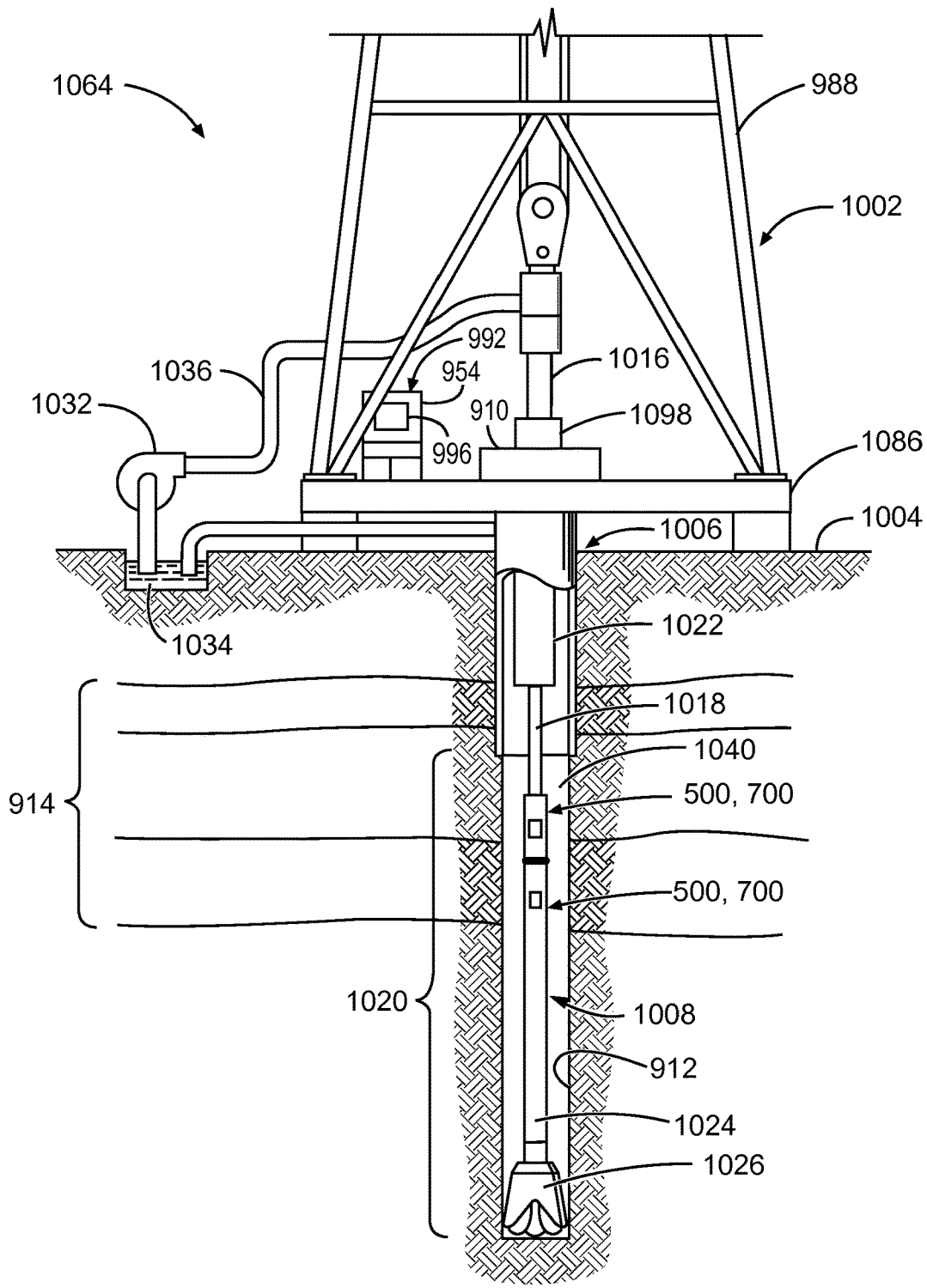
FIG. 10 illustrates a drilling rig system embodiment of the invention.

For example, FIG. 9 illustrates a wireline system 964 embodiment of the invention. FIG. 10 illustrates a drilling rig system 1064 embodiment of the invention. Therefore, the systems 964, 1064 may comprise portions of a wireline logging tool body 970 as part of a wireline logging operation, or of a downhole tool 1024 as part of a downhole drilling operation. The systems 964 and 1064 may include any one or more elements of the apparatus 500 and systems 700 shown in FIGS. 5-7.

Thus, FIG. 9 shows a well during wireline logging operations. In this case, a drilling platform 986 is equipped with a derrick 988 that supports a hoist 990.

Drilling oil and gas wells is commonly carried out using a string of drill pipes connected together so as to form a drilling string that is lowered through a rotary table 910 into a wellbore or borehole 912. Here it is assumed that the drilling string has been temporarily removed from the borehole 912 to allow a wireline logging tool body 970, such as a probe or sonde, to be lowered by wireline or logging cable 974 into the borehole 912. Typically, the wireline logging tool body 970 is lowered to the bottom of the region of interest and subsequently pulled upward at a substantially constant speed.

During the upward trip, at a series of depths, various instruments included in the tool body 970 may be used to perform measurements (e.g., made by the apparatus 500 shown in FIGS. 5-7) on the subsurface geological formations 914 adjacent the borehole 912 (and the tool body 970). The borehole 912 may represent one or more offset wells, or a target well.

The measurement data can be communicated to a surface logging facility 992 for processing, analysis, and/or storage. The logging facility 992 may be provided with electronic equipment for various types of signal processing, which may be implemented by any one or more of the components of the system 700 in FIG. 7. Similar formation evaluation data may be gathered and analyzed during drilling operations (e.g., during logging while drilling operations, and by extension, sampling while drilling).

In some embodiments, the tool body 970 is suspended in the wellbore by a wireline cable 974 that connects the tool to a surface control unit (e.g., comprising a workstation 954). The tool may be deployed in the borehole 912 on coiled tubing, jointed drill pipe, hard wired drill pipe, or any other suitable deployment technique.

Turning now to FIG. 10, it can be seen how a system 1064 may also form a portion of a drilling rig 1002 located at the surface 1004 of a well 1006. The drilling rig 1002 may provide support for a drill string 1008. The drill string 1008 may operate to penetrate the rotary table 910 for drilling the borehole 912 through the subsurface formations 914. The drill string 1008 may include a Kelly 1016, drill pipe 1018, and a bottom hole assembly 1020, perhaps located at the lower portion of the drill pipe 1018.

The bottom hole assembly 1020 may include drill collars 1022, a downhole tool 1024, and a drill bit 1026. The drill bit 1026 may operate to create the borehole 912 by penetrating the surface 1004 and the subsurface formations 914. The downhole tool 1024 may comprise any of a number of different types of tools including measurement while drilling tools, logging while drilling tools, and others.

During drilling operations, the drill string 1008 (perhaps including the Kelly 1016, the drill pipe 1018, and the bottom hole assembly 1020) may be rotated by the rotary table 910. Although not shown, in addition to, or alternatively, the bottom hole assembly 1020 may also be rotated by a motor (e.g., a mud motor) that is located downhole. The drill collars 1022 may be used to add weight to the drill bit 1026. The drill collars 1022 may also operate to stiffen the bottom hole assembly 1020, allowing the bottom hole assembly 1020 to transfer the added weight to the drill bit 1026, and in turn, to assist the drill bit 1026 in penetrating the surface 1004 and subsurface formations 914.

During drilling operations, a mud pump 1032 may pump drilling fluid (sometimes known by those of ordinary skill in the art as "drilling mud") from a mud pit 1034 through a hose 1036 into the drill pipe 1018 and down to the drill bit 1026. The drilling fluid can flow out from the drill bit 1026 and be returned to the surface 1004 through an annular area between the drill pipe 1018 and the sides of the borehole 912. The drilling fluid may then be returned to the mud pit 1034, where such fluid is filtered. In some embodiments, the drilling fluid can be used to cool the drill bit 1026, as well as to provide lubrication for the drill bit 1026 during drilling operations. Additionally, the drilling fluid may be used to remove subsurface formation cuttings created by operating the drill bit 1026.

Thus, referring now to FIGS. 1-7 and 9-10, it may be seen that in some embodiments, the systems 964, 1064 may include a drill collar 1022, a downhole tool 1024, and/or a wireline logging tool body 970 to house one or more apparatus 500, similar to or identical to the apparatus 500 described above and illustrated in FIGS. 1-7. Any and all components of the system 700 in FIG. 7 may also be housed by the tool 1024 or the tool body 970.

The tool 1024 may comprise a downhole tool, such as a logging while drilling (LWD) tool or a measurement while drilling (MWD) tool. The wireline tool body 970 may comprise a wireline logging tool, including a probe or sonde, for example, coupled to a logging cable 974. Many embodiments may thus be realized. For example, in some embodiments, a system 964, 1064 may include a display 996 to present X-ray image data in a well, perhaps in graphic form. Formation and/or cement density and structure may also be displayed.

In summary, the apparatus, systems, and methods disclosed herein make use of a scintillator coupled to a photon detector, designed to operate at elevated temperature in the downhole environment (up to 150 C., and beyond). The combination maintains high detection efficiency at these temperatures, maintaining spatial resolution at energy levels of about 50 keV to about 400 keV, and more. This solution provides more reliable images of the cement, formation, and other structures present in the downhole environment, especially when temperatures are elevated. As a result, the value of services provided by an operation/exploration company may be significantly enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a scintillator to receive photons and transform the photons into scintillation energy at a light yield efficiency of at least 30% at temperatures above 150 C.;
   a position-sensitive detector having a bandgap of at least 2 eV coupled to the scintillator, the detector to receive the scintillation energy at an array of pixels, and to convert the scintillation energy to electron-hole pairs; and
   a processor to further convert an output of the electron-hole pairs into a visual graphical representation of the scintillation energy received at the array of pixels,
   wherein the processor communicates to a display device the graphical representation, and
   wherein the graphical representation displayed is one of a downhole X-ray image data, formation density and structure, or cement density and structure.

2. The apparatus of claim 1, wherein the scintillator comprises a pixelated scintillator.

3. The apparatus of claim 1, wherein the scintillator comprises at least one of NaI:Tl, LaBr$_3$:Ce, LaCl$_3$:Ce, Y$_3$Al$_5$O$_{12}$:Ce, YAlO$_3$:Ce, LuAlO$_3$:Ce, Gd$_2$SiO$_5$:Ce,ZnSe:Te, (Lu,Y)$_2$SiO$_5$:Ce, CsI:Na, or CsI:Tl.

4. The apparatus of claim 1, wherein the detector comprises a semiconductor.

5. The apparatus of claim 4, wherein the semiconductor comprises at least one of a bromide, a carbide, or a nitride.

6. The apparatus of claim 4, wherein the semiconductor comprises at least one of silicon carbide (SiC), thallium bromide (TlBr), cadmium manganese telluride (CdMnTe), or aluminum nitride (AlN).

7. The apparatus of claim 1, wherein the detector comprises a charge-coupled device, a complementary metal-oxide semiconductor (CMOS) sensor, or a photodiode.

8. The apparatus of claim 7, wherein the charge-coupled device comprises a three-phase, silicon carbide (SiC) device.

9. The apparatus of claim 1, further comprising:
   a coupling mechanism used to attach the scintillator to the detector.

10. The apparatus of claim 9, wherein the coupling mechanism comprises a threaded assembly.

11. The apparatus of claim 9, wherein the coupling mechanism comprises a spring-loaded assembly.

12. The apparatus of claim 9, wherein the coupling mechanism comprises epoxy, the epoxy to serve as an energy coupling medium for the scintillation energy between the scintillator and the detector.

13. A system, comprising:
   a source of photons;
   a scintillator to receive the photons and transform the photons into scintillation energy at a light yield efficiency of at least 50% at temperatures above 150 C.;
   a position-sensitive detector having a bandgap of at least 2 eV coupled to the scintillator, the detector to receive the scintillation energy at an array of pixels, and to convert the scintillation energy to electron-hole pairs;

a housing to contain at least one of the source of photons or the detector, the housing comprising one of a wireline tool or a drilling tool; and a processor to further convert an output of the electron-hole pairs into a visual graphical representation of the scintillation energy received at the array of pixels, wherein the processor communicates to a display device the graphical representation, and wherein the graphical representation displayed is one of a downhole X-ray image data, formation density and structure, or cement density and structure.

14. The system of claim 13, wherein the source of photons comprises one of a continuous X-ray source or a pulsed X-ray source.

15. The system of claim 13, wherein the scintillator comprises a pixelated scintillator having individual elements separated by a reflective material.

16. The system of claim 15, wherein the individual elements of the scintillator are aligned with the pixels in the array of the pixels.

17. A method, comprising:

transforming photons received at a scintillator into scintillation energy at a light yield efficiency of at least 50% at temperatures above 150 C.;

converting the scintillation energy to electron-hole pairs within a pixelated array of a position-sensitive detector having a bandgap of at least 2 eV;

processing an output of the electron-hole pairs by converting the output into a visual graphical representation of the scintillation energy received at the pixelated array; and displaying on a display device the graphical representation, wherein the graphical representation displayed is one of a downhole X-ray image data, formation density and structure, cement density and structure.

18. The method of claim 17, further comprising:
operating a source of the photons; and
receiving signals corresponding to the electron-hole pairs in the detector.

19. The method of claim 18, further comprising:
resolving a quantity or a spatial distribution of the electron-hole pairs at the detector, based on the signals.

20. The method of claim 17, further comprising:
reducing scintillation light cross-talk by receiving the photons at the scintillator using reflective material guides forming separate elements in the scintillator.

21. The method of claim 17, wherein the photons have an energy of about 50 keV to about 400 keV.

* * * * *